Jan. 15, 1957 W. F. LINDSEY 2,777,355
DEVICE FOR EVALUATING THE SENSITIVITY OF AN OPTICAL
SYSTEM UTILIZING THE FOUCAULT KNIFE EDGE TEST
Filed July 13, 1954
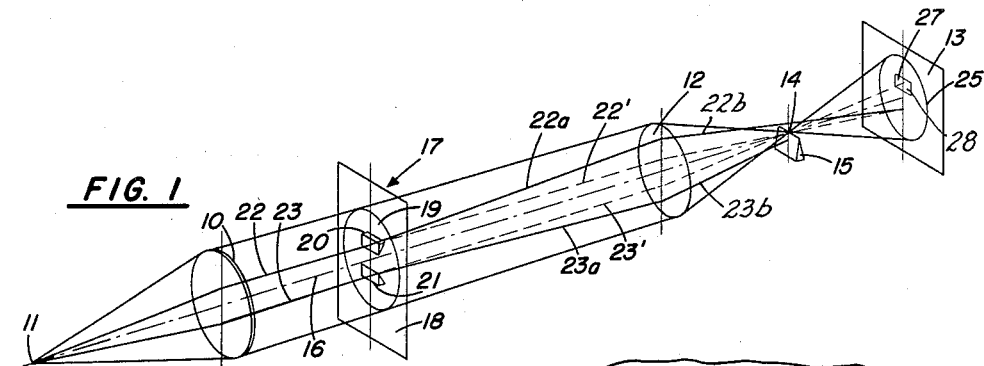
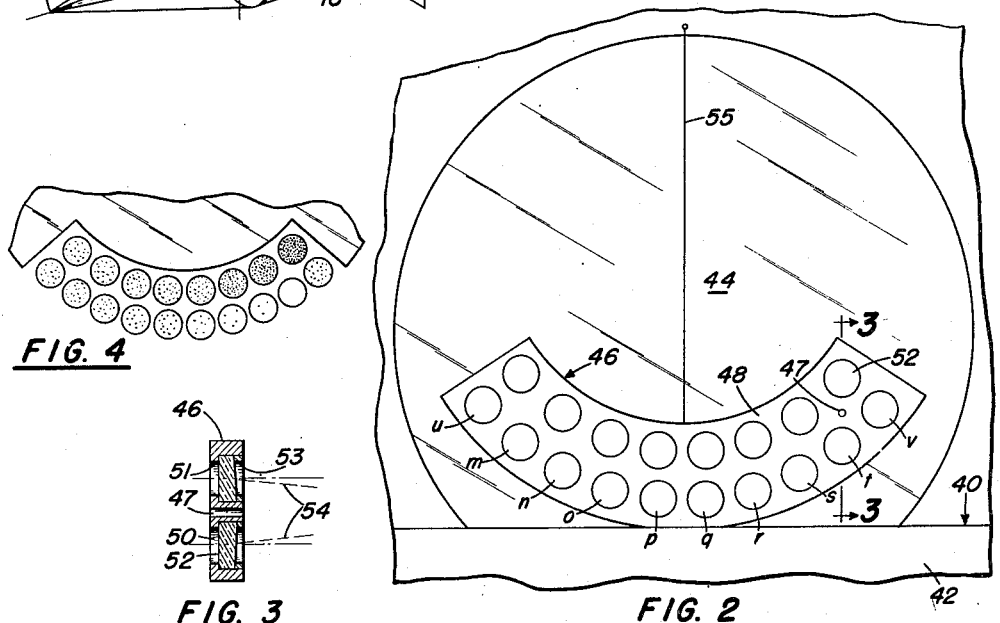
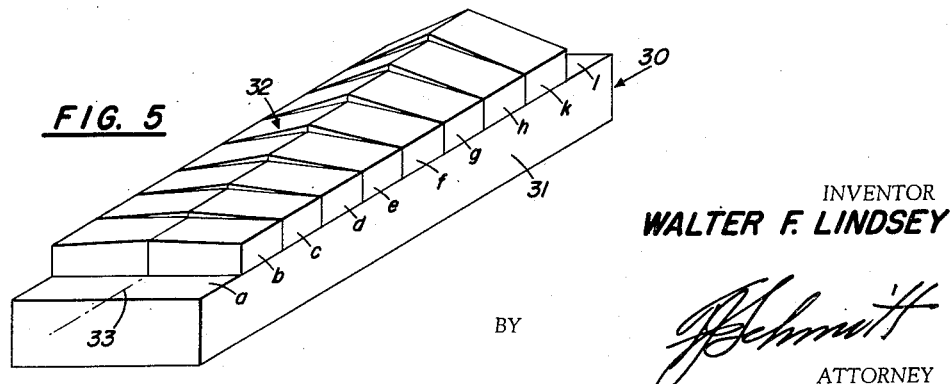
INVENTOR
WALTER F. LINDSEY
BY
ATTORNEY United States Patent Office 2,777,355
Patented Jan. 15, 1957

2,777,355

DEVICE FOR EVALUATING THE SENSITIVITY OF AN OPTICAL SYSTEM UTILIZING THE FOUCAULT KNIFE EDGE TEST

Walter F. Lindsey, Hampton, Va.

Application July 13, 1954, Serial No. 443,174

11 Claims. (Cl. 88—14)

(Granted under Title 35, U. S. Code (1952), sec. 266)

The invention described herein may be manufactured and used by or for the Government of the United States of America for governmental purposes without the payment of any royalties thereon or therefor.

This invention relates to apparatus for determination of the sensitivity of a schlieren optical system for use in the flow field of gases.

In the schlieren optical densitometer, use is made of an arrangement of a collecting lens deriving light from a source at its principal focus and passing parallel light rays through a condensing lens to a screen, which may take the form of a camera film. At the principal focus of the condensing lens an opaque "knife-edge" barrier, as devised by Foucault, is placed to obtain a control of the intensity of screen illumination. For an undisturbed state of the gas between lenses, a uniform screen illumination prevails. However, when the density in the air column between the lenses is disturbed, the light rays passing through the density disturbance are deviated and darker areas appear on the background screen surface due to interception of light rays.

The sensitivity of a schlieren densitometer may be determined by observing the displacement of the knife-edge necessary to bring the light intensity back to its original level, after a density disturbance. Experience has revealed that not only is such a displacement measurement difficult to make but also it is impossible to determine the sensitivity of the optical system and at the same time utilize the system for normal operations, which require a fixed knife-edge position.

It is, therefore, an important object of the invention to provide apparatus which will permit sensitivity determination of schlieren optical systems without movement of the knife-edge. Objects also are to increase the precision and to simplify the method of determination of sensitivity in schlieren optical densitometers.

Other objects and features of the invention will become apparent on consideration of the following description of the invention, with reference to the accompanying drawings, in which:

Fig. 1 is a perspective view of a schematic set-up of the apparatus.

Fig. 2 is a plan view of the optical device used for producing the sensitivity measurements.

Fig. 3 is a section through the prism sector of Fig. 2.

Fig. 4 is a view of a part of the image obtained by the optical device of Fig. 2 when employed in the optical system of Fig. 1, and Fig. 5 is a view of a modification of the optical device.

As indicated in Fig. 1, in a wind tunnel a collecting lens 10 transmits light rays from a source 11 through a condensing lens 12 to a screen 13. At the principal focus 14 of lens 12 an opaque wedge 15 is positioned with its sharp edge at the focus so that it affords a partial block to all light passing through the principal focus and a complete block for all light rays deviated out from the focus that fall upon wedge 15.

At any convenient distance from the collecting lens a plane of observation is fixed at right angles to the main optical axis 16, which coincides with the principal axes of lenses 10 and 12, at which plane an optical device 17 is placed. This device, in Fig. 1, is shown as a flat opaque plate 18 having an aperture 19 centered on the axis 16 and two identical opposed prisms 20 and 21, the prism bases being outward and the prism apexes being inward relative to the optical axis, and the apex lines parallel with each other and with the upper blocking edge of wedge 15.

With the apparatus as described, it is apparent that when positioned in a wind tunnel with light source 11 at the principal focus of lens 10, parallel rays 22 and 23, with the prisms 20 and 21 removed, will come to focus at the cut-off edge of wedge 15 and thence form an image 25 on screen 13. More specifically, parallel rays 22 and 23 after passage through condensing lens 12 will focus at the knife-edge of wedge 15 and continue to form a symmetrical light pattern on the screen 13, in accordance with the showing of broken lines 22′ and 23′. Should the prisms 20 and 21 be now placed as shown in Fig. 1, parallel rays 22 and 23 are bent by the prisms to form angled rays 22a and 23a. On refraction by lens 12, ray 22b, the continuation of ray 22a, is deviated from the cut-off edge of wedge 15 and falls on the image plane without obstruction. Ray 23a, however, since it is also outwardly deviated, as at 23b, is blocked by the opaque wedge substance. Accordingly, an image 27 of prism 21 is formed upon the screen by a reduction in light intensity from the general illumination in image 25; similarly, an image 28 is formed of prism 20 by an increase in light intensity.

With the described apparatus in mind, it is apparent that the prisms function in a manner parallel to any transparent mass interposed in the optical flow system having a density differing from the general transmission medium. If, then, a group of these prism pairs be inserted in the light flow area at the plane of observation, the prisms of each pair differing in angle of light deviation over the others by a small angle, in progressive series, it may be possible to evaluate the sensitivity of the particular optical system involved.

Fig. 5 illustrates an optical device 30 which may be used for such sensitivity evaluation without movement of the wedge 15. This device includes an elongated base block 31 of transparent material, such as glass, on which are mounted a series of pairs of identical prisms 32, positioned base to base along a median line 33. From end to end of the base 31 the angle of light deviation of the prisms of each pair differs over that of the preceding pair of prisms by a small amount, so that a gradation of angularity is secured from zero to a value in the neighborhood of sixty seconds. For example, in Fig. 5 the areas $a$ and $l$ have zero angularity, and the prisms of pairs $b$, $c$, $d$, $e$, $f$, $g$, $h$ and $k$ have an angularity of light deviation amounting in plus and minus second values to 1, 3, 6, 10, 20, 30, 40 and 60, respectively.

In use, this optical device is mounted on the window ledge outside the test section of the wind tunnel, at the plane of observation of a schlieren optical system corresponding to 17 in Fig. 1. The device is here adjusted so that the median line 33 is parallel to the knife-edge of the wedge 15 and the light rays from the source are incident, normally, on the bottom of base block 31. In addition to the normal parallel rays passing through the aperture, there will be rays through end blocks $a$ and $l$ of zero angularity and prism transmitted rays which will form a pattern on the screen along with the normal background. Depending on the sensitivity of the specific optical system, some of the lower prisms pairs will show no variation in light intensity between the prisms of the pairs and the background illumination. However, moving along the prism pattern toward pairs of greater angularity, a pair is reached where the upper prism intensity is darker, and the lower prism intensity is lighter, than the background intensity. This diverging pair together with the next preceding pair giving uniform intensity determine the sensitivity range of the optical system, the angularity lying between that of two names pairs. The images of end blocks $a$ and $l$ juxtapose, with the prism image, images of the background illumination for comparison purposes.

These relationships are brought out more clearly in the modification of the optical device 40 as disclosed in Fig. 2. In this figure, a support 42, designed for mounting at the ledge of window 44 at the wind tunnel test section 45 supports the prism sector 46.

The sector 46 is formed of an opaque curved plate 48 of metal, or the like, in which a plurality of arcuately placed openings 50 are formed. These openings are so placed that in the normal position of Fig. 2 one opening is directly above another to form pairs, there being single terminal openings. Each of these openings is circular and as shown in Fig. 3, has an annular ledge 51 on which the circular prisms 52 are placed, there being a retaining ring 53 for each prism.

It is pointed out that, with the exception of the terminal prisms, the prisms are distributed in vertical pairs, as shown in Fig. 3, with the bases adjoining to secure opposite light deviation as indicated by broken lines 54 of this figure. In Fig. 2 these pairs are lettered from left to right, as $m$, $n$, $o$, $p$, $q$, $r$, $s$, and $t$, the terminal prisms being lettered $u$ and $v$. The prisms of each pair are identical in angularity but each succeeding pair from left to right, as in Fig. 2, has increasing angularity with $u$ and $v$ values equal to zero. For example, a usable angle sequence is plus and minus 3, 6, 10, 15, 20, 30, 40 and 60 seconds for pairs, $m$, $n$, $o$, $p$, $q$, $r$, $s$, and $t$, respectively. The plane containing the prisms is parallel to a plane including the knife-edge of wedge 15. In order to facilitate adjustment of the sector 46 for proper prism positioning a straight and vertical orientation wire 55 is secured to or adjacent the window 44 and a small cylindrical aperture 47 of about one sixteenth inch diameter is formed in the sector 46.

In sensitivity determination with this modified optical device 40, the device is positioned at the plane of observation so that a line joining similar points in corresponding end prisms, for example $u$ and $v$, in Fig. 2, is parallel to the knife-edge of wedge 15 or perpendicular to the wire line 55 with the wire 55 at right angles to the knife-edge of wedge 15. The sector 46 is so oriented that light from source 11 after passage through lens 10 and reflection from the plane rear surfaces of prisms 52 forms images on lens 10 at positions corresponding to the position of the sector in the plane of observation. At this position light visible through aperture 47 should have a circular boundary. If elliptical, the sector should be oriented in the direction of the short diameter of the light ellipse to obtain a circular form, when the adjustment is correct for instrument measurement. Parallel rays from source 11 are now passed through sector prisms and tunnel window 44 producing on the screen 13 an image pattern of the prism rays and background illumination. As in the pattern of the device 30 of Fig. 5, a prism pair may be found, as $p$, where the light intensity is greater than the background intensity, in the lower image, and lesser in the upper image, with the next preceding pair images of intensity value approximately equal to each other and to the background value. The degree value of angular deviation is thus determined as between the degree values of these two prism pairs, which in this case would be between 10 and 15 seconds.

If greater sensitivity measurement is desired, an optical device is used which is identical to 40 of Fig. 2, but having a variation in prism angle of deviation from 0 to 20 seconds instead of from 0 to 60 seconds. Using this finer gradation device the 10 to 15 seconds of the coarser gradation device may be definitely fixed at 15 seconds.

In Fig. 4, by stippling the image areas, the effect of increasing prism pair angularity is indicated toward the right with equivalent image effects on the left, where the angle of deviation is too small to be affected by the given optical system.

Obviously, modifications other than described may be made, and it is, therefore, to be understood that within the scope of the appended claims the invention may be practiced otherwise than as specifically described.

What is claimed is:

1. Optical sensitivity determination apparatus for use in schlieren type optical systems comprising collecting and condensing lenses and including a gas test section, a light source, an image screen, a Foucault knife-edge interceptor between said screen and condensing lens at the principal focus of said condensing lens, an elongated support adapted for placement between the lenses of and external to the gas test section and transverse to the optical axis of said schlieren system, and a plurality of juxtaposed pairs of prisms forming a line of prisms, the prisms of each pair being identical in form but opposed in angularity, mounted on said support, the planes of light deviation of the prism pairs being parallel and the prism angle of each pair changing progressively from one support end to the other.

2. The optical sensitivity determination apparatus as defined in claim 1 with separate prisms of each pair being placed in separate arcuate lines, the prisms of one line being formed to transmit rays of positive angularity and the prism of the other line being formed to transmit rays of negative angularity.

3. The optical sensitivity determination apparatus as defined in claim 2, with an added prism at either end of said prism line having zero angularity.

4. The optical sensitivity determination apparatus as defined in claim 1 with the angles of light deviation of the prisms of each pair differing by fixed amounts from the angles of pairs next adjoining.

5. The optical sensitivity determination apparatus as defined in claim 1 with the angle of light deviation of the prisms of each pair being opposed and differing cumulatively over the angle of the prisms in the next pair, moving from pairs of low angle to the pair of largest angle.

6. The optical sensitivity determination apparatus as defined in claim 1 with said pairs of prisms being positioned side by side along a straight line, and a transparent base for supporting the prisms on said lens optical axis between said lenses and transversely to said axis.

7. The optical sensitivity determination apparatus as defined in claim 4 with the terminal pair of prisms in said line of prisms having zero angularity.

8. An optical device for determination of sensitivity in schlieren type optical apparatus using the Foucault knife-edge light interceptor which comprises a support, a sector plate attached to said support having arcuately placed openings therein placed one above another in pairs, opposed identical prisms in the two openings of each pair, the angle of light deviation of the prisms of each pair differing from that of adjacent pairs, and means for adjusting said device with reference to the Foucault knife-edge when placed in said optical apparatus.

9. The optical device as defined in claim 8 said adjusting means including a fixed aligning wire adjacent said sector and an orientation aperture in said sector having an axis normal to the sector plane.

10. The optical device as defined in claim 8 with the angle of each prism of each pair changing by progressive amounts, moving from one end of the sector to the other.

11. An optical device for determination of sensitivity in optical apparatus using the Foucault knife-edge light interceptor which comprises a support, a transparent base block of elongated form, a series of pairs of prisms fixed base to base along the long axis of said block, the prisms of each pair being identical and the light deviation angle of the prisms of each pair differing progressively, moving from end to end along the block axis.

References Cited in the file of this patent

UNITED STATES PATENTS

| | | |
|---|---|---|
| 1,351,430 | Luboshey | Aug. 31, 1920 |
| 2,229,410 | Gulden | Jan. 21, 1941 |

FOREIGN PATENTS

| | | |
|---|---|---|
| 923,701 | France | Feb. 24, 1947 |